United States Patent
Abe et al.

(10) Patent No.: US 11,954,353 B2
(45) Date of Patent: Apr. 9, 2024

(54) TAPE-TO-TAPE COPYING BETWEEN NODES OF MAGNETIC TAPE FILE SYSTEMS

(71) Applicant: International Business Machines Corporation, Armonk, NY (US)

(72) Inventors: Atsushi Abe, Ebina (JP); Tohru Hasegawa, Tokyo (JP); Hiroshi Itagaki, Yokohama (JP); Tsuyoshi Miyamura, Yokohama (JP); Shinsuke Mitsuma, Tokyo (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 17/448,747

(22) Filed: Sep. 24, 2021

(65) Prior Publication Data

US 2023/0103203 A1     Mar. 30, 2023

(51) Int. Cl.
*G06F 3/00* (2006.01)
*G06F 3/06* (2006.01)

(52) U.S. Cl.
CPC .......... *G06F 3/0647* (2013.01); *G06F 3/0604* (2013.01); *G06F 3/0682* (2013.01)

(58) Field of Classification Search
CPC ..... G06F 3/0647; G06F 3/0604; G06F 3/0682
See application file for complete search history.

(56) References Cited

U.S. PATENT DOCUMENTS

| | | | |
|---|---|---|---|
| 6,477,628 B1 * | 11/2002 | Bish | G06F 11/1461 714/E11.12 |
| 9,213,496 B2 | 12/2015 | Gibble | |
| 10,437,504 B1 | 10/2019 | Bao | |
| 2006/0080500 A1 | 4/2006 | Manthey | |
| 2009/0006733 A1 | 1/2009 | Gold | |
| 2013/0271865 A1 * | 10/2013 | Amir | G11B 5/00826 |
| 2014/0313609 A1 | 10/2014 | Abe | |
| 2015/0169455 A1 | 6/2015 | Fried | |
| 2016/0062671 A1 * | 3/2016 | Iwasaki | G06F 3/0619 707/640 |

(Continued)

OTHER PUBLICATIONS

International Search Report and Written Opinion for Application No. PCT/CN2022/120562, dated Oct. 28, 2022, 11 pages.

(Continued)

*Primary Examiner* — Reginald G Bragdon
*Assistant Examiner* — Michael L Westbrook
(74) *Attorney, Agent, or Firm* — Joseph P. Curcuru (57) ABSTRACT

In an approach to improve magnetic tape file systems through tape-to-tape copying between nodes on a Linear Tape File System using a cluster-wide named pipe. Embodiments transfer data between a first node and a second node. Additionally, both the first node and the second node implement a parallel shared-disk file system through a data path for node data reading and writing from a shared-disk and to the shared-disk. Further, to transfer data between the first node and the second node, embodiments write, by the first node, the data for tape-to-tape copy from a first tape drive to the shared-disk, and write, by the second node, the data written from the shared-disk to a second tape drive.

20 Claims, 6 Drawing Sheets

(56) References Cited

U.S. PATENT DOCUMENTS

2016/0283493 A1   9/2016   Wideman

OTHER PUBLICATIONS

"Copying data from one instance to another using the PIPE option," Informix Servers Version 12.10, IBM Documentation, Last Updated: Aug. 30, 2021, 2 pages. https://www.ibm.com/docs/en/informix-servers/12.10?topic=Idfunp-copying-data-from-one-instance-another-using-pipe-option.

"How to move data from one tape media generation to another," IBM Spectrum Archive Edition (EE) Version 1.2.6.0, IBM Documentation, Last updated: Mar. 5, 2021, 2 pages. https://www.ibm.com/docs/en/spectrum-archive-ee/1.2.6.0?topic=mtsp-how-move-data-from-one-tape-media-generation-another.

Koltsidas et al., "Seamlessly Integrating Disk and Tape in a Multi-tiered Distributed File System," 2015 IEEE 31st International Conference on Data Engineering, Apr. 2015, pp. 1328-1339. DOI: 10.1109/ICDE.2015.7113380.

* cited by examiner

TAPE-TO-TAPE COPYING BETWEEN NODES OF MAGNETIC TAPE FILE SYSTEMS

BACKGROUND OF THE INVENTION

The present invention relates generally to the field of magnetic tape file systems, and more particularly to tape-to-tape copying between nodes on a Linear Tape File System.

Linear Tape File System (LTFS) refers to both the format of data recorded on magnetic tape media and the implementation of specific software that uses this data format to provide a file system interface to data stored on magnetic tape. The LTFS format is a self-describing magnetic tape format, by Storage Networking Industry Association (SNIA) LTFS Technical Work Group, to meet magnetic tape archiving requirements. The LTFS Format specification defines the organization of data and metadata on magnetic tape, where the files are stored in a hierarchical directory structure. Data tapes written in the LTFS Format can be used independent of any external database or storage system to allow direct access to file content data and file metadata. The LTFS format makes it possible to implement software that presents a standardized file system view of the data stored in the magnetic tape media. The LTFS file system view can make accessing files stored on the LTFS formatted media similar to accessing files stored on other forms of storage media such as disk or removable drives.

Typical modern operating systems (OS) have an inter-process communication mechanism called a named pipe that operates as a part of file system and is used for inter-process data transfer. The named pipe supports inter-process communicates within the same machine and the socket interface is usually used for inter-machine process communication. However, socket interface is accompanied by network communication. Meanwhile, file systems that support hierarchical storage management (HSM) (e.g., a file system used to distribute and manage data across multiple servers (i.e., General Parallel File System (GPFS)) enable movement of file data on the disk between devices according to access frequency and importance of data, which enables files on the GPFS disk to be placed on the tape.

SUMMARY

Embodiments of the present invention disclose a computer-implemented method, a computer program product, and a system for copying data tape-to-tape between nodes on a Linear Tape File System using a cluster-wide named pipe, the computer-implemented method comprising: transferring data between a first node and a second node, wherein both the first node and the second node implement a parallel shared-disk file system through a data path for node data reading and writing from a shared-disk and to the shared-disk, and wherein the transferring of data between the first node and the second node comprises: writing, by the first node, the data for tape-to-tape copy from a first tape drive to the shared-disk; and writing, by the second node, the data written from the shared-disk to a second tape drive.

DETAILED DESCRIPTION

Embodiments of the present invention recognize that in linear Tape File System (LTFS) operation of transferring a file on a general parallel file system (GPFS) disk to a tape leaves the metadata of the file on the disk. Embodiments of the present invention recognize that the operation to discard data blocks of a file is referred to as stubbing, a stubbed file is referred to as a stub, and a file in such a state is referred to as a migrated file. Such a series of operation is also called migration. Embodiments of the present invention recognize that if there is access to the stub on GPFS, GPFS requests LTFS to restore the data blocks, in which LTFS then reads the data blocks stored on the tape to restore the data blocks on the disk. Embodiments of the present invention recognize that this operation is referred to as recall.

The recalled stub has the data blocks on both the GPFS disk and the tape. The file in such a state is referred to as a pre-migrated file. Embodiments of the present invention recognize that when there is an access request from the user, data on the GPFS disk is returned to the user. Embodiments of the present invention recognize that no data copy is made when a request to migrate a pre-migrated file is made; however, simple stubbing prompts transition of the file into a migrated file. Tape devices may be write-append devices. Therefore, occurrence of writing error during writing data prevents subsequent data recording. Embodiments of the present invention recognize that the tape medium itself also deteriorates physically resulting from repeating insertion into the tape drive for reading and writing several times, thus finally having difficulty of loading data into the tape.

Embodiments of the present invention recognize that LTFS determines that a tape needs to be replaced when there is a tape writing/reading error that is caused by the tape. In this case, embodiments of the present invention recognize that, LTFS changes the state of the tape to "require_replace" or "need_replace" to prompt the user to transfer all files written in the tape to another tape (replace process), wherein no data is appended subsequently in migration to the tape labeled as "require_replace" or "need_replace" though such a tape still functions as a target to read in recall. Embodiments of the present invention recognize that in the replace process, all files placed on a tape need to be copied to another tape and when LTFS is composed of several nodes and there is a restriction on tape drives accessible from each host, the data needs to be copied using a route from a first tape drive to a first GPFS server to a second tape drive or a route from a first tape drive to a first GPFS server to a second GPFS server to a second tape drive.

Currently, embodiments of the present invention recognize that LTFS adopts an algorithm using two drives connected to the same LTFS node, and often uses the route from a first tape drive to a first GPFS server to a second tape drive. However, embodiments of the present invention recognize that in some cases such as transfer from a linear tape-open (LTO) 6 (i.e., LTO-6) tape to LTO-9 tape, the route from a first tape drive to a first GPFS server to a second tape drive to a third tape drive needs to be used in association with the type of tape and the generation of tape drive assigned to an LTFS node. Currently, embodiments of the present invention recognize that data transfer using TCP/IP such as secure copy protocol (scp) is adopted in the transfer from a first GPFS server to a second GPFS server, though there is a problem arising from increased network traffic used by the management network and users. Scp is a file transfer method between computers that is known and understood in the art.

Embodiments of the present invention solves such a problem through the use of tape-to-tape copy based on an extended copy (XCOPY) command provided by the tape drive. XCOPY is one of small computer system interface (SCSI) command that tape drive supports. XCOPY command enables that one data drive transfer records on tape to another drive by itself (if both tape drives are connected into same Storage Area Network (SAN)). Only data transfer is required to copy data between tapes. Embodiments of the present invention recognize that before introducing this command only one way to transfer records on tape is a computer read records from a tape through a tape drive and then write them to another tape through another tape drive. The records transfer to the computer once and re transfer to another drive. In other words two data transfers would be needed to execute and complete a data copy. However, embodiments of the present invention recognize that this command merely allows simple record copy and is therefore difficult to use in LTFS format in which a record number is recorded in a file extent. Embodiments of the present invention recognize that the management network is for use in not only serving as an access means in machine maintenance but also collecting logs. Thus, a traffic increase in this network is problematic to the administrator. Embodiments of the present invention recognize that when network file system (NFS) is used to make GPFS look like a network disk, the network used by the user is typically used to access data. In this case, users who access data via some means other than GPFS server and GPFS client will suffer from performance deterioration. NFS is a method to share files on one or more networks.

The problem to be solved by the present invention is to suppress such a network traffic increase. Embodiments of the present invention improve the art and solve the issues stated above by transferring data between nodes, wherein each node may implement a parallel, shared-disk file system (i.e., GPFS and LTFS), based on a data path for the node reading/writing data from/to the shared-disk, wherein the node (GPFS sever) has at least one tape drive and all data for tape-to-tape copy between the nodes are passed the data path, wherein the all data for tape-to-tape copy are written to the shared-disk from one tape drive for tape-to-tape copy via the node having the one tape drive and then written to other tape drive for tape-to-tape copy from the shared-disk via the node having the other tape drive, wherein the data path is provided by introducing a named pipe of inter-process communication on the parallel, shared-disk file system or an object which resembles the named pipe, wherein the named pipe or the object uses an I/O channel of the shared-disk, and wherein the node is a server in a cluster of servers.

Implementation of embodiments of the invention may take a variety of forms, and exemplary implementation details are discussed subsequently with reference to the Figures (i.e., FIG. 1A-FIG. 4).

Figure 1A:
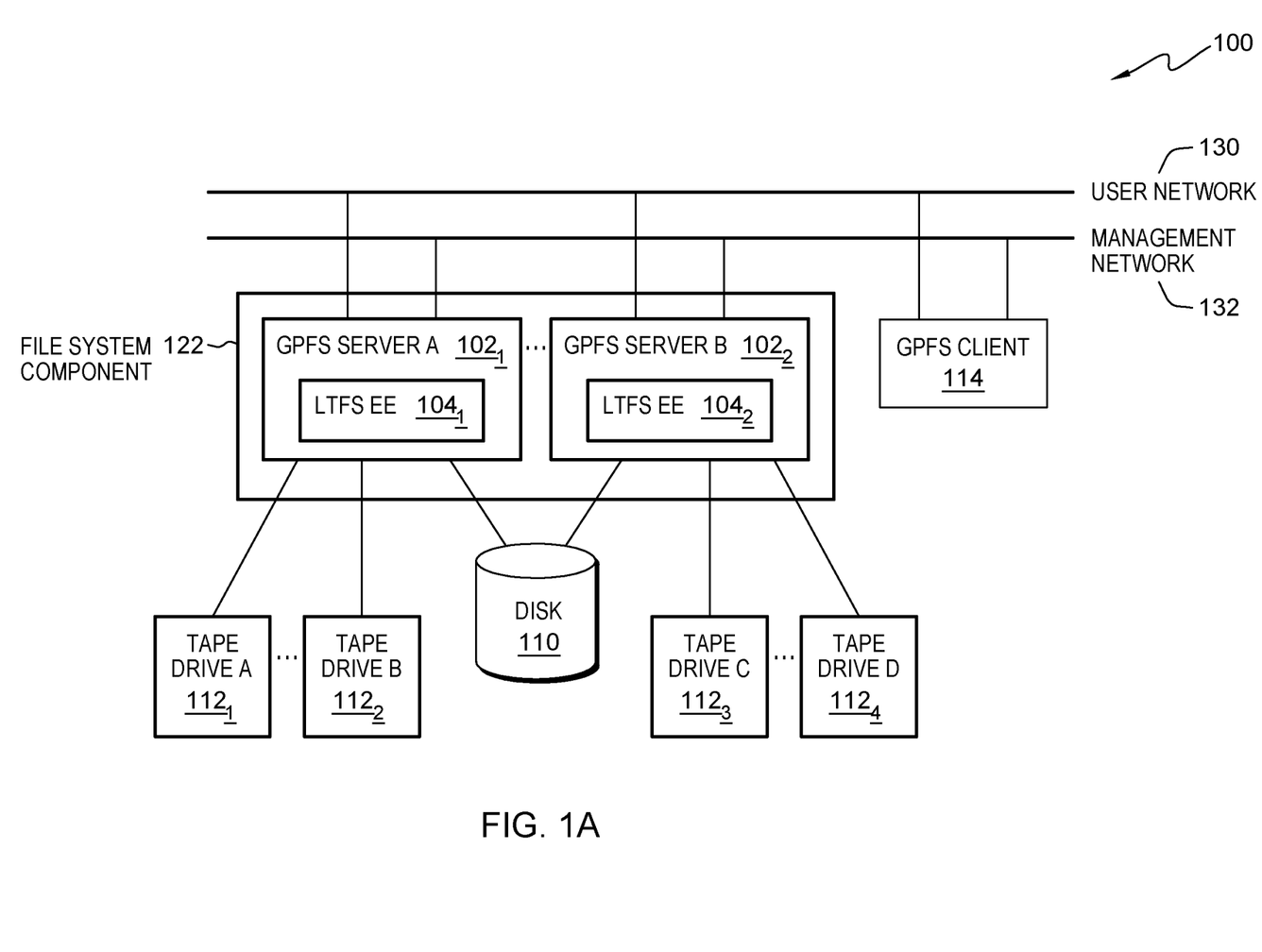
FIGS. 1A-1C are functional block diagrams illustrating a distributed data processing environment, in accordance with an embodiment of the present invention.

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes GPFS server 102 and 102, Tap driver 112-112, disk 110, and GPFS client device (GPFS client) 114 interconnected over user network (network) 130 and/or management network 132.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. Management network 132 may be, for example, a network that is separated from the production network and used for things such as connecting management ports on switches and remote access ports from servers. In general, network 130 and management network 132 may each be any combination of connections and protocols that will support communications between GPFS client 114 and GPFS server $102_1$ and/or GPFS server $102_2$, and any other computing devices and/or storage devices (not shown in FIG. 1A) within distributed data processing environment 100.

In some embodiments of the present invention, GPFS client 114 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, GPFS client 114 may be representative of any programmable computing device or a combination of programmable computing devices capable of executing machine-readable program instructions and communicating with users of other computing devices via network 130 and/or capable of executing machine-readable program instructions and communicating with GPFS server $102_1$ and/or GPFS server $102_2$. In some embodiments GPFS client 114 may represent a plurality of computing devices.

In some embodiments of the present invention, GPFS client 114 may represent any programmable electronic computing device or combination of programmable electronic computing devices capable of executing machine readable program instructions, manipulating executable machine-readable instructions, and communicating with GPFS server $102_1$ and/or GPFS server $102_2$ and other computing devices (not shown) within distributed data processing environment 100 via a network, such as network 130. GPFS client 114 may include an instance of a user interface (interface), and a local storage. In various embodiments, not depicted in FIG. 1A, GPFS client 114 may have a plurality of interfaces. In other embodiments, not depicted in FIG. 1A, distributed data processing environment 100 may comprise a plurality of computing devices, plurality of server computers, and/or one a plurality of networks. GPFS client 114 may include internal and external hardware components, as depicted, and described in further detail with respect to FIG. 4.

User interface (interface), not depicted in FIG. 1A, provides an interface to file system component (component) 122. GPFS client 114, via the interface, may enable a user and/or a client to interact with component 122 and/or GPFS server $102_1$ and/or GPFS server $102_2$ in various ways, such as sending program instructions, receiving program instructions, sending and/or receiving messages, updating data, sending data, inputting data, editing data, collecting data, and/or receiving data. In one embodiment, interface may be a graphical user interface (GUI) or a web user interface (WUI) and may display at least text, documents, web browser windows, user options, application interfaces, and instructions for operation. interface may include data (such as graphic, text, and sound) presented to a user and control sequences the user employs to control operations. In another embodiment, interface may be a mobile application software providing an interface between a user of GPFS client 114 and GPFS server $102_1$ and/or GPFS server $102_2$. Mobile application software, or an "app," may be designed to run on smart phones, tablet computers and other computing devices. In an embodiment, interface may enable the user of GPFS client 114 to at least send data, input data, edit data (annotations), collect data and/or receive data.

GPFS server $102_1$ and/or GPFS server $102_2$ may each be a standalone computing device, a management server, a web server, a mobile computing device, one or more client servers, or any other electronic device or computing system capable of receiving, sending, and processing data. In other embodiments, GPFS server $102_1$ and/or GPFS server $102_2$ may each represent a server computing system utilizing multiple computers such as, but not limited to, a server system, such as in a cloud computing environment. In another embodiment, GPFS server $102_1$ and/or GPFS server $102_2$ may each represent a computing system utilizing clustered computers and components (e.g., database server computers, application server computers, etc.) that act as a single pool of seamless resources when accessed within distributed data processing environment 100. GPFS server $102_1$ and/or GPFS server $102_2$ may each include internal and external hardware components, as depicted, and described in further detail with respect to FIG. 4. In some embodiments GPFS server $102_1$ and/or GPFS server $102_2$ may each represent a plurality of server computers. In various embodiments, not depicted in FIG. 1A, distributed data processing environment 100 may comprise a plurality of GPFS servers (e.g., GPFS server $102_{1-N}$), wherein N represents a positive integer, and accordingly the number of scenarios implemented in a given embodiment of the present invention is not limited to those depicted in FIG. 1A.

In the depicted embodiment, LTFS $104_1$ and LTFS $104_2$ each execute on GPFS server $102_1$ and GPFS server $102_2$ respectively. In other embodiments, not depicted in FIG. 1A, LTFS $104_1$ and LTFS $104_2$ may each execute anywhere within distributed data processing environment 100 as long as LTFS $104_1$ and LTFS $104_2$ each communicate with GPFS server $102_1$ and/or GPFS server $102_2$, tape drive $112_{1-4}$ and/or GPFS client 114, via network 130 and/or management network 132. In various embodiments, not depicted in FIG. 1A, distributed data processing environment 100 may comprise a plurality of LTFS (e.g., LTFS $104_{1-N}$) on GPFS servers (e.g., GPFS server $102_{1-N}$), wherein N represents a positive integer, and accordingly the number of scenarios implemented in a given embodiment of the present invention is not limited to those depicted in FIG. 1A. In some embodiments, LTFS $104_{1-N}$ may be a particular enterprise edition.

Tape drive $112_1$-$112_4$ are each a data storage device that reads and writes data on a magnetic tape. Magnetic tape data storage is typically used for offline, archival data storage. Magnetic tape data storage is a system for storing digital information on magnetic tape using digital recording. In various embodiments, not depicted in FIG. 1A, distributed data processing environment 100 may comprise a plurality of tape drives (e.g., tape drive $112_{1-N}$), wherein N represents a positive integer, and accordingly the number of scenarios implemented in a given embodiment of the present invention is not limited to those depicted in FIG. 1A.

Disk 110 may be a data/knowledge repository and/or a database that may be written and/or read by one or a combination of component 122, GPFS server $102_1$ and/or GPFS server $102_2$, tape drive $112_{1-4}$ and GPFS client 114. In some embodiments, disk 110 may be a data/knowledge repository, a knowledge base, a knowledge center, a knowledge corpus, and/or a database that may be written and/or read by one or a combination of component 122, GPFS server $102_1$ and/or GPFS server $102_2$ and GPFS client 114. Shared storage and/or local storage may each be implemented with any type of storage device capable of storing data and configuration files that may be accessed and utilized by GPFS server $102_1$ and/or GPFS server $102_2$, such as, but not limited to, a database server, a hard disk drive, or a flash memory. In various embodiments, not depicted in FIG. 1A, in addition to shared storage, server computer comprises a primary and a secondary database. The primary database, also referred to as primary storage device, may be one or more of any type of disk storage known in the art. The secondary database, also referred to as secondary storage device, may be one or more any type of tape storage known in the art.

In the depicted embodiment, component 122 is a parallel file system that comprises GPFS server $102_1$ and/or GPFS server $102_2$. In various embodiments of the present invention, not depicted in FIG. 1A, GPFS server $102_1$ and/or GPFS server $102_2$ may each be located and/or executed anywhere within distributed data processing environment 100 as long as component 122 is connected to and/or communicates with, GPFS client 114, and/or GPFS server $102_1$ and/or GPFS server $102_2$, via network 130 and/or management network 132. A node may be a GPFS server (e.g., GPFS server $102_1$ and/or GPFS server $102_2$). For example, GPFS server $102_1$ will be a first node and GPFS server $102_2$ will be a second node.

To suppress an increase in the network traffic used by users, a data path for storage that is used for reading/writing data is used instead of an IP network to transfer data between servers, which enables GPFS performance to be maintained for users who used to access data through the network (i.e., maintain GPFS performance). In various embodiments, an object which resembles a named pipe is introduced to the GPFS. In the GPFS, files written on one or more disks (i.e., disk 110) from one or more GPFS servers (e.g., GPFS server $102_1$ and/or GPFS server $102_2$) and GPFS client 114 can be accessed by any GPFS servers and GPFS client 114s within the cluster. This function is expanded to introduce a special file object referred to as a global first-in-first-out (gfifo) object, or simply "gfifo." A gfifo is a special named object on GPFS which can be created by mkfifo( ) system call. The gfifo can work on two or more nodes on GPFS as opposed to a traditional first-in-first-out (FIFO) which only works on a single machine. In general, first-in-first-out (FIFO) is an alias of named pipe in filesystem. The mkfifo( ) system call is the mkfifo( ) function as it is known and used in the art. In various embodiments, a gfifo is created by executing a mkfifo( ) system call. A gfifo can be deleted by unlink( ) system call in the same manner as the named object. In various embodiments, the created gfifo is accessible from GPFS server $102_1$ and/or GPFS server $102_2$ or GPFS client 114. In various embodiments, written data is stored by a certain GPFS server (e.g., GPFS server $102_1$ and/or GPFS server $102_2$) or GPFS client 114 into gfifo as a file block on disk 110. In various embodiments, when gfifo is opened and read by other GPFS servers (GPFS server $102_1$ and/or GPFS server $102_2$) or GPFS client 114s, data can be read from the head of gfifo. In various embodiments, data read from the gfifo is released from the file block on disk 110.

An example of gfifo implemented on GPFS is as follows. When receiving a mkfifo( ) system call, GPFS creates a gfifo entry in metadata of file system. Gfifo metadata may comprise, but is not limited to, a list of stored data blocks, head offset, and stored data length. In various embodiments, not depicted in FIG. 1A, nodes are notified of the gfifo metadata through the GPFS mechanism as it is known and understood in the art. In this example, when receiving an open( ) system call to gfifo, GPFS returns a file descriptor in the same manner as general files and named FIFO. Further, when receiving a write( ) system call to a file descriptor linked to gfifo, GPFS writes received data into a data block and updates the metadata which is then notified to other nodes by using GPFS mechanism. In this example, when receiving a read( ) system call to a file descriptor linked to gfifo, GPFS reads a data block based on current head offset information and returns the data. Additionally, GPFS updates the metadata which is then notified to other nodes by using GPFS mechanism. In this example, to suppress the amount of usage of disk to a certain level or less, gfifo has an upper-limit set for the amount of usage of disk, wherein the upper-limit value may be a fixed value, variable after creation of gfifo, or dynamically and automatically set.

Figure 1B:
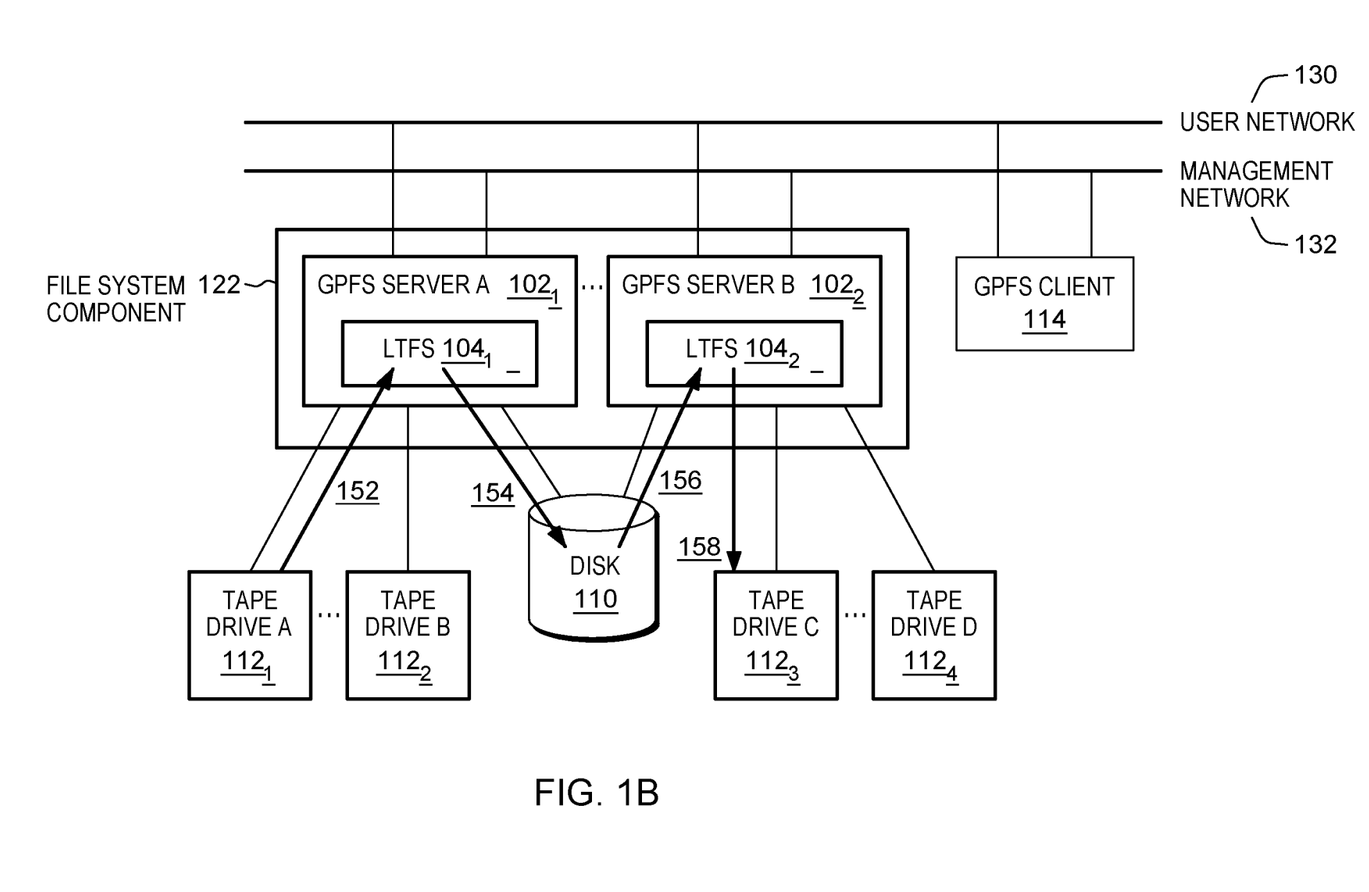

In various embodiments, as depicted in FIG. 1B, component 122 may transfer data between a first and second node (e.g., GPFS server $102_1$ and GPFS server $102_2$), wherein each node may implement a parallel, shared-disk file system (i.e., GPFS and LTFS), based on a data path for node reading and writing data to and from the shared-disk (e.g., disk 110), wherein the first and second node each comprise at least one tape drive (e.g., tape drive $112_1$) and at least a portion of the data for tape-to-tape copy between the first and second nodes is passed through the data path. In various embodiments, component 122 writes at least a portion of the data tape-to-tape copy to the shared-disk (e.g., disk 110) from a first tape drive for tape-to-tape copy (e.g., tape drive $112_1$) via the first node having the first tape drive (e.g., GPFS server $102_1$) and then writes to a second tape drive (e.g., tape drive $112_3$) for tape-to-tape copy from the shared-disk (e.g., disk 110) via the second node having the second tape drive (e.g., GPFS server $102_2$), wherein the data path is provided by introducing a named pipe of inter-process communication on the parallel shared-disk file system or an object which resembles the named pipe, wherein the named pipe or the object uses an I/O channel of the shared-disk, and wherein the node is a server in a cluster of servers.

In one example, data path 152 represents component 122 receiving and/or reading data, via LTFS $104_1$ on GPFS server $102_1$, from tape drive $112_1$ and/or tape drive $112_2$, wherein data path 154 represents component 122, via GPFS server $102_1$, writing at least a portion of the received data to disk 110. In this particular example, data path 156 represents component 122 reading, via LTFS $104_2$ on GPFS server $102_2$, the at least portion of the received data from disk 110, wherein data path 158 represents component 122 writing, via LTFS $104_2$ on GPFS server $102_2$, the at least portion of the received data to tape drive $112_3$ and/or tape drive $112_4$. In various embodiments, component 122 outputs, via an interface on GPFS client 114, a responsive prompt to one or more users that indicates the data transfer from the first node to second node is complete.

Figure 1C:
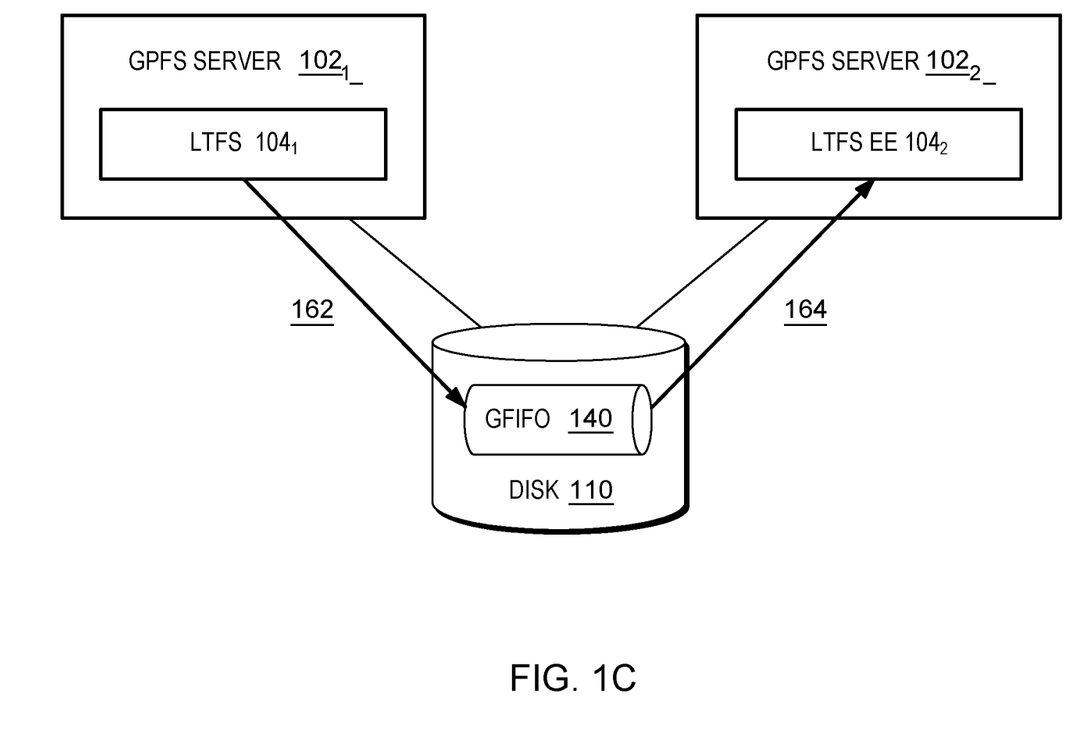

In various embodiments, as depicted in FIG. 1C, component 122 may transfer data between a first and second node (e.g., GPFS server $102_1$ and GPFS server $102_2$). FIG. 1C provides an illustration of one implementation and does not imply any limitations with regard to the environments in which different embodiments may be implemented. Many modifications to the depicted environment may be made by those skilled in the art without departing from the scope of the invention as recited by the claims.

In FIG. 1C data flow 162 represents data movement from GPFS Server $102_1$, via LTFS $104_1$, to gfifo 140 on disk 110, wherein LTFS $104_1$ acts as a data mover (e.g., writer). Gfifo 140 may execute on applications on GPFS servers (e.g., GPFS server $102_1$ and GPFS server $102_2$). In FIG. 1C, component 122, not depicted in FIG. 1C, instructs an application to create gfifo 104 and write data, via LTFS $104_1$, to gfifo 140 using the logic detailed in FIG. 2 below. Data flow 164 depicts data movement from gfifo 140 on disk 110 to GPFS Server $102_2$, via LTFS $104_2$, wherein LTFS $104_2$ acts as a data mover (e.g., reader). In FIG. 1C, component 122, not depicted in FIG. 1C, instructs an application on GPFS Server $102_2$ to open gfifo 140 and read the data, via LTFS $104_2$, from gfifo 140 using the logic detailed in FIG. 3 below. In this embodiment, LTFS $104_1$ on GPFS server $102_1$ reads data from one or more first tape drives (e.g., tape drive $112_1$ and/or tape drive $112_2$) and writes the read data to gfifo 140. Additionally, in this embodiment, LTFS $104_2$ on GPFS server $102_2$ reads data from gfifo 140 and writes the read data to one or more second tape drives (e.g., tape drive $112_3$ and/or tape drive $112_4$).

Figure 2:
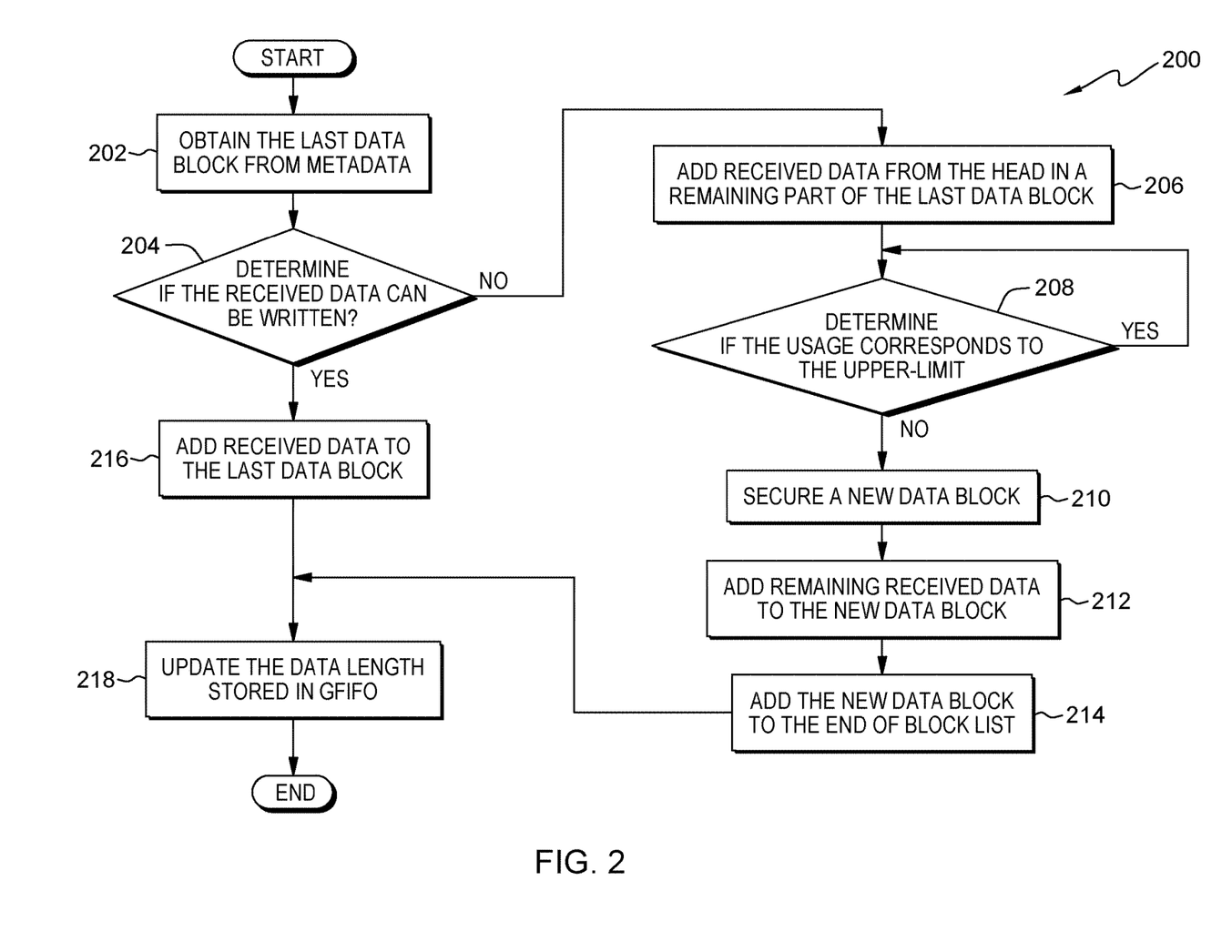
FIG. 2 illustrates operational steps of a file system component, on a server computer within the distributed data processing environment of FIG. 1A, for transferring data between nodes for a write( ) system call, in accordance with an embodiment of the present invention.

FIG. 2 illustrates operational steps of component 122, generally designated 200, in communication with server computer 120, within distributed data processing environment 100 of FIG. 1A, for transferring data between nodes for a write( ) system call (i.e., write call), in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 obtains the last data block from metadata. In various embodiments, component 122 obtains, via LTFS $104_1$, one or more previously stored data blocks from the metadata on tape drive $112_1$ and/or tape drive $112_2$. In some embodiments, component 122 obtains the most recently stored (i.e., last/latest) data block from the metadata stored on disk 110. LTFS 104$_1$ may read data from tape drive 112$_1$ and/or tape drive 112$_2$ and write to gfifo 140.

In step 204, component 122 determines if the received data can be written in the last data block. In various embodiments, component 122 determines if the one or more received data can be written in the last data block on disk 110. In the depicted embodiment, if the one or more received data can be written in the last data block (Yes step), then component 122 advances to step 216. However, in the depicted embodiment, if component 122 determines that the one or more received data is unable to be written in the last data block (No step), then component 122 advances to step 206.

In step 206, component 122 adds the received data to a remining portion of the last data block. In various embodiments, component 122 adds received data from the head of a remaining portion of the last data block.

In step 208, component 122 determines if the usage corresponding to the upper-limit. In various embodiments, component 122 determines if the amount of usage of disk correspond to the upper-limit value. Generally, a filesystem manages an object (like files or a directory). The gfifo (e.g., gfifo 140) is one of object on filesystem. Filesystem has typically two types of data. One is metadata and the second is contents. Metadata may comprise, but is not limited to, file name, file size, and timestamps. This upper limit is a part of the metadata of the file, and it can be stored on disk 110 (as a part of meta-data) and share through file a descriptor. In the depicted embodiment, if component 122 determines the usage corresponds to one or more upper limits (Yes step) then component 122 repeats step 208 until the usage corresponds to one or more upper-limits. However, in the depicted embodiment, if the usage does not correspond to one or more upper-limits then (No step) then component 122 advances to step 210.

In step 210, component 122 secures a new data block. In various embodiments, component 122 secures one or more new data blocks on disk 110.

In step 212, component 122 adds the remaining received data to the secured new data block. In various embodiments, component 122 adds one or more of the remaining received data from step 204 to the one or more secured new data blocks from step 212.

In step 214, component 122 adds the new data block to the end of block list of the data block. In various embodiments, component 122 adds one or more new data blocks to the end of the block list of the data block on disk 110.

In step 216, component 122 adds the received data to the last data block. In various embodiments, component 122 adds the one or more received data to the last data block on disk 110.

In step 218 updates the data length stored in gfifo 140. In various embodiments, component 122 updates the data length based on the added new data blocks stored in gfifo 140, wherein updating the data length comprises writing one or more new data blocks to a gfifo object (i.e., gfifo 140) on disk 110 and updating the gfifo object metadata on disk 110.

Figure 3:
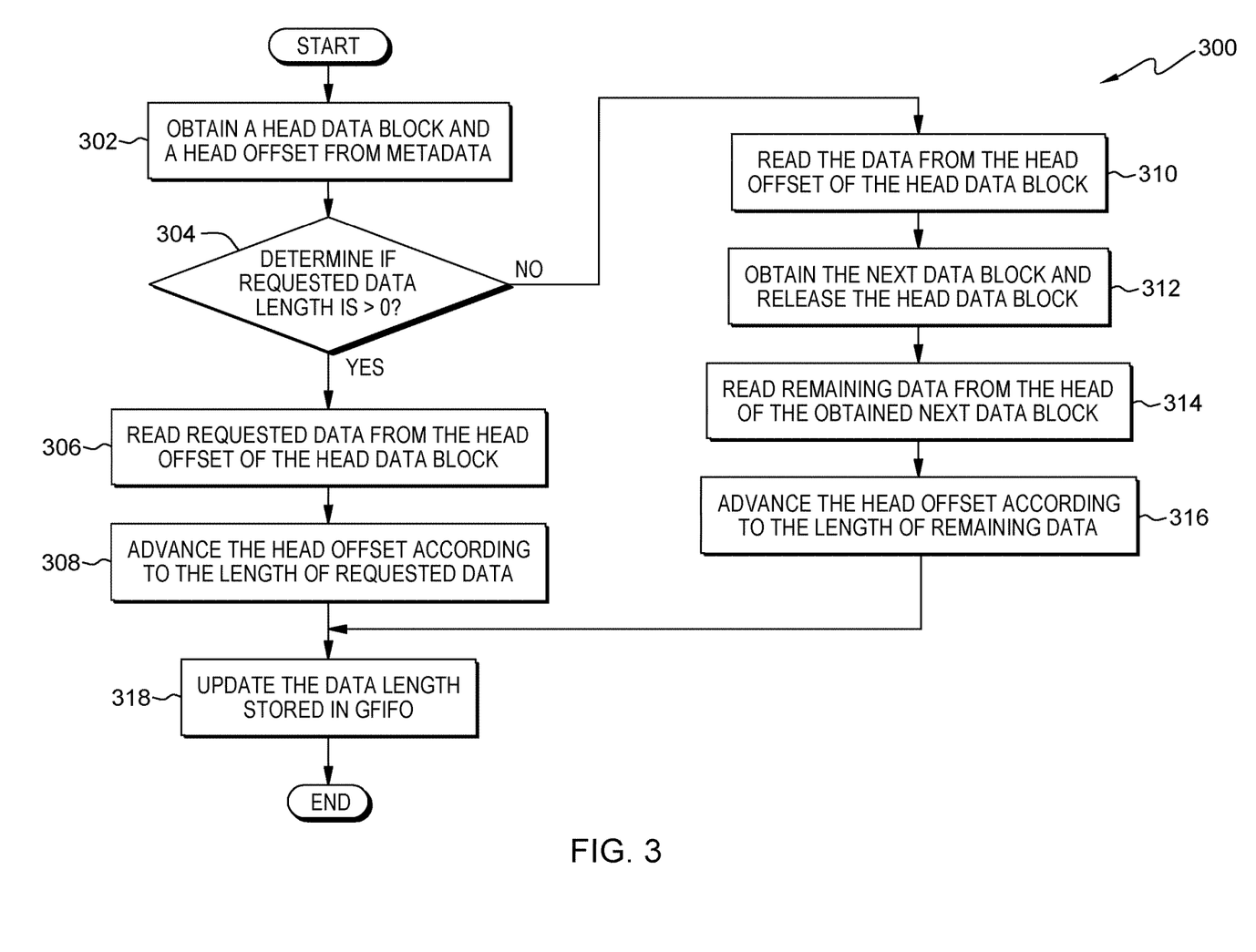
FIG. 3 illustrates operational steps of the file system component, on a server computer within the distributed data processing environment of FIG. 1A, for transferring data between nodes for a read( ) system call, in accordance with an embodiment of the present invention.

FIG. 3 illustrates operational steps of component 122, generally designated 300, in communication with server computer 120, within distributed data processing environment 100 of FIG. 1A, for transferring data between nodes for a read( ) system call (i.e., read call), in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 122 obtains a head data block and a head offset from the metadata. In various embodiments, component 122 obtains one or more head data blocks and head offset from the gfifo metadata.

In step 304, component 122 determines if the requested data length for the head data block is greater than zero (i.e., 0). In the depicted embodiment, if component 122 determines the requested data length for the head data block is greater than 0 (Yes step) then component 122 advances to step 306. However, in the depicted embodiment, if component 122 the requested data length for the head data block is not greater than advances to step 310 then component 122 advances to step 310.

In step 306, component 122 reads requested data from the head offset of the head data block. In various embodiments, component 122 reads the requested data from the head offset of the head data block.

In step 308, component 122 advances the head offset according to the length of the requested data. In various embodiments, GFPS advances the head offset according to at least a portion of the length of at least a portion of the requested data.

In step 310, component 122 reads the data from the head offset of the head data block. In various embodiments of the present invention, component 122 reads at least a portion of the data from the head offset of the head data block. In some embodiments, component 122 reads all of the data from the head offset of the head data block.

In step 312, component 122 obtains the next data block and releases the head data block. In various embodiments, component 122 obtains one or more next data blocks and releases the obtained head data block.

In step 314, component 122 reads the remaining data from the head of the obtained next data block. In various embodiments, component 122 reads at least a portion of the remaining data from the head of the obtained next data block.

In step 316, component 122 advances the head offset according to the length of the remaining data. In various embodiments, component 122 advances the head offset according to the length of at least a portion of the remaining data.

In step 318, component 122 updates the data length stored in gfifo 140. In various embodiments, component 122 updates at least a portion of the data length stored in gfifo 140, wherein updating the data length comprises writing one or more new data blocks to a gfifo object (i.e., gfifo 140) on disk 110 and updating the gfifo object metadata on disk 110.

Figure 4:
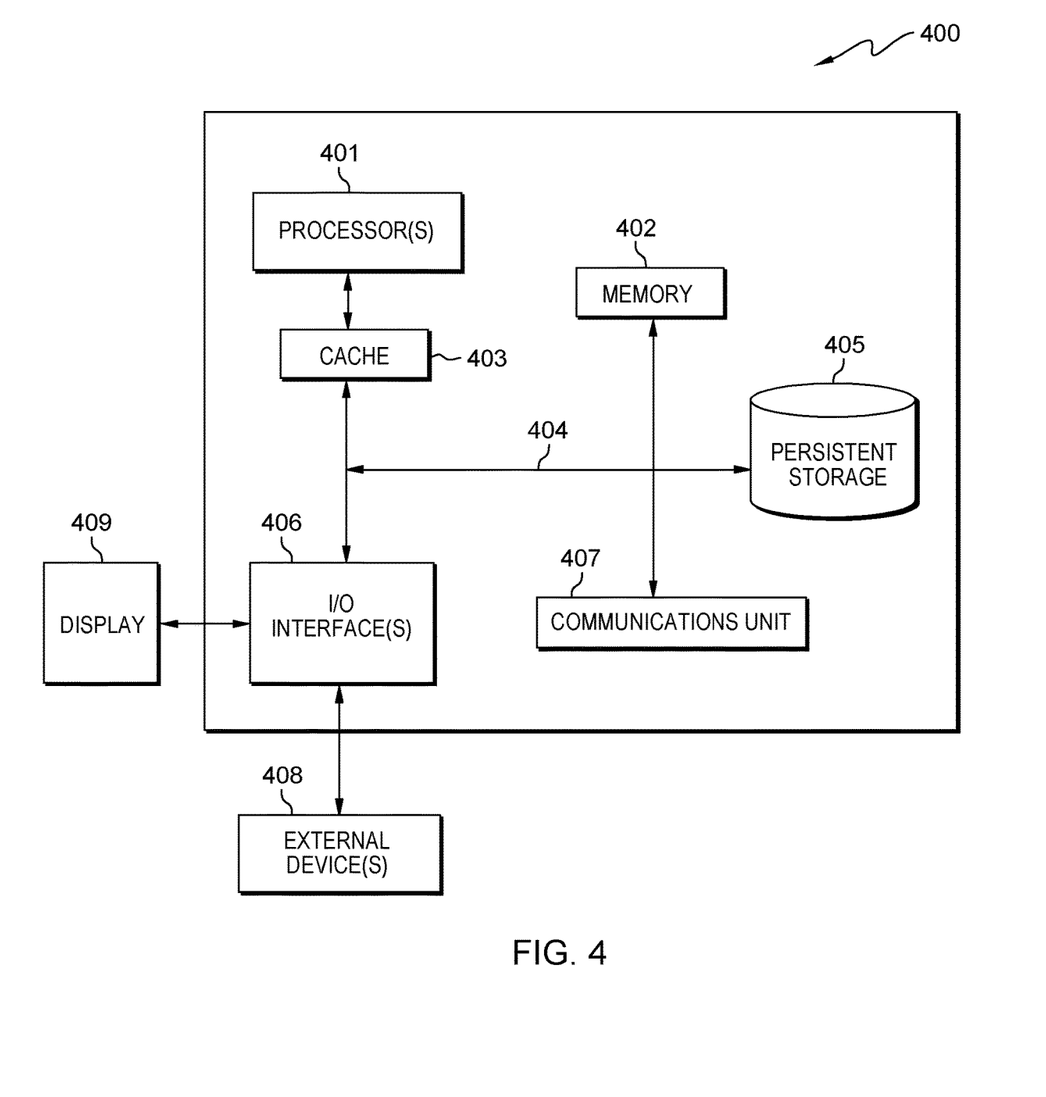
FIG. 4 depicts a block diagram of components of the server computer executing the file system component within the distributed data processing environment of FIG. 1A, in accordance with an embodiment of the present invention.

FIG. 4 depicts a block diagram of components of GPFS server 102$_1$ and GPFS server 102$_2$ within distributed data processing environment 100 of FIG. 1A, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 depicts computer system 400, where GPFS server 102$_1$ and GPFS server 102$_2$ represents an example of computer system 400 that includes component 122. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for tape-to-tape copying between nodes on a Linear Tape File System using a cluster-wide named pipe, the computer-implemented method comprising:
    transferring data, through a data path for storage, between a first node and a second node, wherein both the first node and the second node implement a parallel shared-disk file system through the data path for storage, wherein the data path for storage comprises node data reading and writing from a shared-disk and to the shared-disk, and wherein the transferring of data between the first node and the second node comprises:
        writing, by the first node, the data for tape-to-tape copy from a first tape drive to the shared-disk; and
        writing, by the second node, the data written from the shared-disk to a second tape drive, wherein writing the data from the shared-disk to the second tape drive comprises:
            obtaining one or more head data blocks and head offset from metadata of a global first-in-first-out (gfifo) object; and
            responsive to determining a requested data length for the one or more head data blocks is greater than zero, reading at least a portion of the data from a head offset of the one or more head data blocks.

2. The computer-implemented method of claim 1, wherein writing from the first tape drive to the shared-disk comprises:
    obtaining a last data block from stored metadata;
    responsive to determining received data can be written on the last data block on the shared-disk, adding the received data to the last data block of the shared-disk; and
    responsive to determining an amount of usage of the shared-disk does not correspond to an upper-limit value, securing a new data block on the shared-disk.

3. The computer-implemented method of claim 2, further comprising:
    adding the received data to a secured new data block;
    adding a new data block to an end of a block list of the data block on the shared-disk; and
    updating a data length, associated with the data written from the shared-disk to a second tape drive, based on the added new data blocks stored in a global first-in-first-out (gfifo) object, wherein updating the data length comprises writing one or more new data blocks to the gfifo object on the shared-disk and updating metadata of the gfifo object on the shared-disk.

4. The computer-implemented method of claim 1, wherein writing the data from the shared-disk to the second tape drive further comprises:
    obtaining a next data block and releasing the obtained one or more head data blocks.

5. The computer-implemented method of claim 1, further comprising:
    reading at least a portion of the data from the head of the obtained next data block;

advancing the head offset according to a length of at least a portion of the data from the head of the obtained next data block; and updating at least a portion of the data length stored in the global first-in-first-out (gfifo) object.

6. The computer-implemented method of claim 1, wherein the data path is provided by introducing a named pipe of inter-process communication on the parallel, shared-disk file system or an object which resembles the named pipe.

7. The computer-implemented method of claim 6, wherein the named pipe or the object uses an input/output channel of the shared-disk, and wherein the first node the second node are each a server in a cluster of servers.

8. A computer system for tape-to-tape copying between nodes on a Linear Tape File System using a cluster-wide named pipe, the computer system comprising:
one or more computer processors;
one or more computer readable storage devices;
program instructions stored on the one or more computer readable storage devices for execution by at least one of the one or more computer processors, the stored program instructions comprising:
program instructions to transfer data, through a data path for storage, between a first node and a second node, wherein both the first node and the second node implement a parallel shared-disk file system through the data path for storage, wherein the data path for storage comprises node data reading and writing from a shared-disk and to the shared-disk, and wherein the transferring of data between the first node and the second node comprises:
program instructions to write, by the first node, the data for tape-to-tape copy from a first tape drive to the shared-disk; and
program instructions to write, by the second node, the data written from the shared-disk to a second tape drive, wherein writing the data from the shared-disk to the second tape drive comprises:
program instructions to obtain one or more head data blocks and head offset from metadata of a global first-in-first-out (gfifo) object; and
responsive to determining a requested data length for the one or more head data blocks block is greater than zero, program instructions to read at least a portion of the data from a head offset of the one or more head data blocks.

9. The computer system of claim 8, wherein writing from the first tape drive to the shared-disk comprises:
program instructions to obtain a last data block from stored metadata;
responsive to determining received data can be written on the last data block on the shared-disk, program instructions to add the received data to the last data block of the shared-disk; and
responsive to determining an amount of usage of the shared-disk does not correspond to an upper-limit value, program instructions to secure a new data block on the shared-disk.

10. The computer system of claim 9, further comprising:
program instructions to add the received data to a secured new data block;
program instructions to add a new data block to an end of a block list of the data block on the shared-disk; and
program instructions to update a data length, associated with the data written from the shared-disk to a second tape drive, based on the added new data blocks stored in a global first-in-first-out (gfifo) object, wherein updating the data length comprises writing one or more new data blocks to the gfifo object on the shared-disk and updating metadata of the gfifo object on the shared-disk.

11. The computer system of claim 8, wherein writing the data from the shared-disk to the second tape drive comprises:
program instructions to obtain a next data block and releasing the obtained one or more head data blocks.

12. The computer system of claim 8, further comprising:
program instructions to read at least a portion of the data from the head of the obtained next data block;
program instructions to advance the head offset according to a length of at least a portion of the data from the head of the obtained next data block; and
program instructions to update at least a portion of the data length stored in the global first-in-first-out (gfifo) object.

13. The computer system of claim 8, wherein the data path is provided by introducing a named pipe of inter-process communication on the parallel, shared-disk file system or an object which resembles the named pipe.

14. The computer system of claim 13, wherein the named pipe or the object uses an input/output channel of the shared-disk, and wherein the first node the second node are each a server in a cluster of servers.

15. A computer program product for tape-to-tape copying between nodes on a Linear Tape File System using a cluster-wide named pipe, the computer program product comprising:
one or more computer readable storage devices and program instructions stored on the one or more computer readable storage devices, the stored program instructions comprising:
program instructions to transfer data, through a data path for storage, between a first node and a second node, wherein both the first node and the second node implement a parallel shared-disk file system through the data path for storage, wherein the data path for storage comprises node data reading and writing from a shared-disk and to the shared-disk, and wherein the transferring of data between the first node and the second node comprises:
program instructions to write, by the first node, the data for tape-to-tape copy from a first tape drive to the shared-disk; and
program instructions to write, by the second node, the data written from the shared-disk to a second tape drive, wherein writing the data from the shared-disk to the second tape drive comprises:
program instructions to obtain one or more head data blocks and head offset from metadata of a global first-in-first-out (gfifo) object; and
responsive to determining a requested data length for the one or more head data blocks block is greater than zero, program instructions to read at least a portion of the data from a head offset of the one or more head data blocks.

16. The computer program product of claim 15, wherein writing from the first tape drive to the shared-disk comprises:
program instructions to obtain a last data block from stored metadata;

responsive to determining received data can be written on the last data block on the shared-disk, program instructions to add the received data to the last data block of the shared-disk; and responsive to determining an amount of usage of the shared-disk does not correspond to an upper-limit value, program instructions to secure a new data block on the shared-disk.

17. The computer program product of claim 16, further comprising:

program instructions to add the received data to a secured new data block;

program instructions to add a new data block to an end of a block list of the data block on the shared-disk; and program instructions to update a data length, associated with the data written from the shared-disk to a second tape drive, based on the added new data blocks stored in a global first-in-first-out (gfifo) object, wherein updating the data length comprises writing one or more new data blocks to the gfifo object on the shared-disk and updating metadata of the gfifo object on the shared-disk.

18. The computer program product of claim 15, wherein writing the data from the shared-disk to the second tape drive comprises:

program instructions to obtain a next data block and releasing the obtained one or more head data blocks.

19. Computer program product of claim 15, further comprising:

program instructions to read at least a portion of the data from the head of the obtained next data block;

program instructions to advance the head offset according to a length of at least a portion of the data from the head of the obtained next data block; and program instructions to update at least a portion of the data length stored in the global first-in-first-out (gfifo) object.

20. The computer program product of claim 15, wherein the data path is provided by introducing a named pipe of inter-process communication on the parallel, shared-disk file system or an object which resembles the named pipe, and wherein the named pipe or the object uses an input/output channel of the shared-disk, and wherein the first node the second node are each a server in a cluster of servers.

* * * * *